(12) United States Patent
Stone et al.

(10) Patent No.: US 6,359,019 B1
(45) Date of Patent: Mar. 19, 2002

(54) GRAFT POLYMERIC MEMBRANES AND ION-EXCHANGE MEMBRANES FORMED THEREFROM

(75) Inventors: Charles Stone, Vancouver; Alfred E. Steck, West Vancouver, both of (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 08/967,960

(22) Filed: Nov. 12, 1997

(51) Int. Cl.[7] ................................. C08J 5/22; C08J 5/20
(52) U.S. Cl. ........................... 521/27; 429/12; 521/25; 521/30; 521/32; 521/33; 525/276; 526/251
(58) Field of Search .............................. 521/27, 30, 32, 521/33

(56) References Cited

U.S. PATENT DOCUMENTS

| | | | | |
|---|---|---|---|---|
| 3,341,366 A | * | 9/1967 | Hodgdon, Jr. ............... | 521/27 |
| 4,012,303 A | * | 3/1977 | D'Agostino ........... | 204/159.17 |
| 4,113,922 A | | 9/1978 | D'Agostino et al. | |
| 4,140,815 A | * | 2/1979 | Dege ............................ | 427/44 |
| 4,169,023 A | | 9/1979 | Sata et al. | |
| 4,262,041 A | * | 4/1981 | Eguchi ........................ | 427/245 |
| 5,049,253 A | * | 9/1991 | Izuo ............................. | 204/301 |
| 5,140,074 A | | 8/1992 | DeNicola, Jr. ............... | 525/263 |
| 5,420,200 A | * | 5/1995 | Koning ........................ | 525/68 |
| 5,422,411 A | * | 6/1995 | Wei .............................. | 526/243 |
| 5,777,038 A | * | 7/1998 | Nishikawa ................... | 525/295 |
| 5,817,718 A | | 10/1998 | Nezu et al. .................... | 525/64 |
| 5,863,994 A | * | 1/1999 | DeNicola, Jr. ............... | 526/74 |

FOREIGN PATENT DOCUMENTS

| | | |
|---|---|---|
| EP | 0 140 544 | 5/1985 |
| WO | WO 95/08581 | 3/1995 |

OTHER PUBLICATIONS

Hodgdon et al., *Preparation and Polymerizability of Substituted alpha, beta, beta–Trifluorostyrenes, Journal of Polymer Science: Part A–1*, vol. 6, pp. 711–717.

* cited by examiner

*Primary Examiner*—Fred Zitomer
(74) *Attorney, Agent, or Firm*—McAndrews, Held & Malloy, Ltd.

(57) ABSTRACT

Graft polymeric membranes in which one or more trifluorovinyl aromatic monomers are radiation graft polymerized to a preformed polymeric base film are provided, as well as ion-exchange membranes prepared therefrom. Preferred monomers include substituted $\alpha$, $\beta$, $\beta$-trifluorostyrenes and trifluorovinyl naphthalenes which are activated towards the grafting reaction or facilitate the introduction of more than one ion-exchange group per monomer unit in the grafted chains. The ion-exchange membranes are useful in dialysis applications, and particularly in electrochemical applications, for example as membrane electrolytes in electrochemical fuel cells and electrolyzers.

39 Claims, 1 Drawing Sheet

GRAFT POLYMERIC MEMBRANES AND ION-EXCHANGE MEMBRANES FORMED THEREFROM

FIELD OF THE INVENTION

The present invention relates to graft polymeric membranes in which one or more trifluorovinyl aromatic monomers are radiation graft polymerized to a preformed polymeric base film. Where the grafted polymeric chains are modified to incorporate ion-exchange groups, the resultant membranes are useful in dialysis applications, and particularly in electrochemical applications, for example as membrane electrolytes in electrochemical fuel cells and electrolyzers.

BACKGROUND OF THE INVENTION

The preparation of graft polymeric membranes by radiation grafting of a monomer to a polymeric base film has been demonstrated for various combinations of monomers and base films. The grafting of styrene to a polymeric base film, and subsequent sulfonation of the grafted polystyrene chains has been used to prepare ion-exchange membranes.

U.S. Pat. No. 4,012,303, reports the radiation grafting of $\alpha$, $\beta$, $\beta$-trifluorostyrene (TFS) to polymeric base films using gamma co-irradiation, followed by the introduction of various ion-exchange substituents to the pendant aromatic rinas of the grafted chains. With co-irradiation, since the TFS monomer is simultaneously irradiated, undesirable processes such as monomer dimerization and/or independent homopolymerization of the monomer may occur in competition with the desired graft polymerization reaction.

U.S. Pat. No. 4,012,303 also reports that the TFS monomer may be first sulfonated and then grafted to the base film. Thus, the introduction of ion-exchange groups into the membrane can be done as part of the grafting process, or in a second step.

More recently, the grafting of TFS to pre-irradiated polymeric base films, followed by the introduction of various substituents to the pendant aromatic rings of the grafted chain has been reported in U.S. Pat. No. 4,605,685. Solid or porous polymeric base films, such as for example polyethylene and polytetrafluoroethylene, are pre-irradiated and then contacted with TFS neat or in solution. Pre-irradiation is reportedly a more economic and efficient grafting technique, reportedly giving a percentage graft of 10–50% in reaction times of 1–50 hours. Aromatic sulfonation, haloalkylation, amination, hydroxylation, carboxylation, phosphonation and phosphoration are among the reactions subsequently used to introduce ion-exchange groups into the grafted polymeric chains. Post-sulfonation rates of 40% to 100% are reported.

In either case the prior art TFS-based grafted membranes incorporate a maximum of one functional group per monomer unit in the grafted chain. Further, they typically incorporate only one type of functional group as substituents on the pendant aromatic rings in the grafted chains.

In the present invention, one or more types of substituted TFS monomers are grafted to polymeric base films, the substituents being selected to offer particular advantages, for example:

(a) substituted TFS monomers which are activated by virtue of their aromatic substituents have increased reactivity in the grafting reaction facilitating grafting and/or are activated in subsequent reactions to introduce ion-exchange functionality into the grafted chains;

(b) grafted chains comprising monomer units with more than one aromatic ring permit the introduction of more than one ion-exchange group per grafted monomer unit, enabling the achievement of higher ion-exchange capacities at lower percentage grafts than in prior art grafted polymeric membranes.

(c) substituted TFS monomers in which the substituents are precursors to ion-exchange groups may be transformed to ion-exchange groups after the grafting reaction, and can facilitate the introduction of more than one type of ion-exchange group into the grafted chains, for example, so that both cation and anion exchange groups may be incorporated in a membrane.

Other trifluorovinyl aromatic or heteroaromatic monomers offering one or more of the above described advantages similarly may be grafted to polymeric base films to give novel graft polymeric membranes.

SUMMARY OF THE INVENTION

Graft polymeric membranes comprise one or more trifluorovinyl aromatic monomers radiation graft polymerized to a preformed polymeric base film. In a first embodiment, a graft polymeric membrane comprises a preformed polymeric base film to which has been graft polymerized a substituted $\alpha$, $\beta$, $\beta$-trifluorostyrene monomer selected from the group consisting of monomers of formula (I):

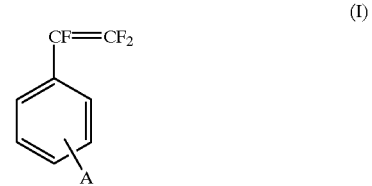

(I)

The group A may be OR, SR, NRR' (where R and R' are independently selected from the group consisting of alkyl, fluoroalkyl and aryl), which are substituents that activate the monomer.

The monomer of formula (I) may have more than one aromatic ring, for example when A is Ph, OPh, SPh, N(R)Ph (where R is selected from the group consisting of hydrogen, Ph, alkyl and fluoroalkyl), $(CH_2)_n$Ph or $(CF_2)_n$Ph (where n is an integer greater than zero). Of these, the groups Ph, OPh, SPh, N(R)Ph are particularly preferred.

Other substituents, A, which are useful precursors to ion-exchange groups can be advantageously selected, for example, $SO_2X$ (where X is selected from the group consisting of F, Cl, Br, I), OH, $NH_2$, CN, and $NO_2$.

In a second embodiment, a graft polymeric membrane comprises a preformed polymeric base film to which has been graft polymerized a trifluorovinyl naphthalene monomer selected from the group consisting of monomers of formula (II):

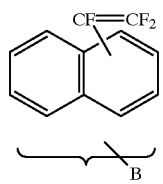

(II)

B may be hydrogen, or may be selected from the preferred substituents described above for A in formula (I).

These and other trifluorovinyl polyaromatic and heteroaromatic monomers may be advantageously graft polymerized to polymeric base films, as such monomer units provide more sites for subsequent introduction of functional groups, ard in many cases, the aromatic rings are electron rich and activated compared to that of TFS.

In any of the embodiments described above, the preformed polymeric base film may be grafted with a single monomer whereby the grafted chains are homopolymeric. Alternatively, the preformed polymeric base film may be grafted with a mixture of monomers to give grafted chains which are copolymeric. The monomer mixture may comprise, or may consist predominantly of, one or more monomers described by the formulae. In some embodiments the mixture may consist of monomers described by the formulae.

Preferred vinyl monomers for co-grafting with those described by the formulae include styrene and ethylene-based monomers, fluorinated ethylene-based monomers, and other α, β, β-trifluorostyrene monomers. For example, one or more monomers of formula (III) may be included in the mixture:

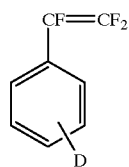

(III)

where D is selected from the group consisting of hydrogen, halomethyl, perfluoroalkyl, perfluoroalkenyl and fluorine and $SO_3^-M^+$, the latter representing a sulfonic acid salt where $M^+$ is a counterion.

Depending on the nature of the monomers incorporated into the grafted chains of the membranes described above, ion-exchange groups may be introduced by the transformation of precursor groups already present as aromatic substituents in the monomers, and/or via post-graft reaction processes. For example, the membranes may be subjected to a reaction process selected from the group consisting of sulfonation, phosphonation, phosphorylation, amination, carboxylation, hydroxylation and nitration whereby ion-exchange groups are introduced into pendant aromatic rings of the grafted chains, directly by these reaction processes or via these reaction processes in combination with subsequent steps.

In one embodiment, an ion-exchange membrane comprises a preformed polymeric base film with grafted chains comprising monomer units of formula (IV):

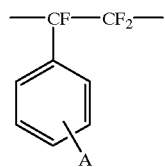

(IV)

where A is OH, OR, SR or NRR' (where R and R' are independently selected from the group consisting of alkyl, fluoroalkyl and aryl) and at least a portion of the monomer units include at least one ion-exchange substituent on the aromatic ring thereof. In preferred embodiments at least a portion of the monomer units include at least two ion-exchange substituents, which may the same or different from each other, on the aromatic ring thereof. If at least two ion-exchange substituents are present on the ring, A may also be hydrogen. In a particularly preferred embodiment, A is selected from the group consisting of OR (where R is selected from the group consisting of alkyl and fluoroalkyl), and at least a portion of the monomer units include two $SO_3H$ substituents on the aromatic ring thereof.

In another embodiment, an ion-exchange membrane comprises a preformed polymeric base film with grafted chains comprising monomer units of formula (IV) where A is $(CH_2)_nPH$ and $(CF_2)_nPh$ (where is n is an integer greater than zero) or more preferably Ph, OPh, SPh or N(R)Ph (where R is selected from the group consisting of hydrogen, Ph, alkyl and fluoroalkyl) and at least a portion of the monomer units include at least one ion-exchange substituent on an aromatic ring thereof. In preferred embodiments at least a portion of the monomer units include at least two ion-exchange substituents which may the same or different from each other. These monomer units have more than one aromatic ring and therefore facilitate the introduction of more than one ion-exchange group per monomer unit. In a particularly preferred embodiment A is OPh and at least a portion of the monomer units include two $SO_3H$ substituents.

In a still further embodiment, an ion-exchange membrane comprises a preformed polymeric base film with grafted chains comprising monomer units of formula (V):

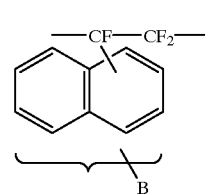

(V)

B is selected from the group consisting of hydrogen, OR, SR, NRR' (where R and R' are independently selected from the group consisting of alkyl, fluoroalkyl and aryl), Ph, OPh, SPh, N(R)Ph (where R is selected from the group consisting of hydrogen, Ph, alkyl and fluoroalkyl), $(CH_2)_nPh$ and $(CF_2)_nPh$ (where n is an integer greater than zero), and at least a portion of the monomer units include at least one ion-exchange substituent on the naphthyl ring structure thereof. In preferred embodiments at least a portion of the monomer units include at least two ion-exchange substituents, which may the same or different from each other, on the naphthyl ring structure thereof. These naphthyl monomer units facilitate the introduction of more than one ion-exchange group per monomer unit.

The preferred embodiments described above in which at least a portion of the monomer units include at least two ion-exchange substituents enable ion-exchange membranes wherein the grafted chains include an average of greater than one ion-exchange substituent per monomer unit in the grafted chains. In these particularly preferred ion-exchange membranes, not every monomer unit in the grafted chains necessarily includes two or even one ion-exchange substituent, but because enough monomer units include two or more ion-exchange substituents, on average the monomer units in the chain include more than one ion-exchange substituent.

The ion-exchange membranes described above may include more than one different type of ion-exchange group in the grafted chains, for example it is possible to incorporate both anion- and cation-exchange groups. The different ion-exchange groups may be introduced in post-grafting reactions, however it is generally more convenient to introduce at least one of them via a precursor substituent present on one of the graft polymerized monomers.

Another embodiment of an ion-exchange membrane comprises a preformed polymeric base film with grafted chains comprising a first monomer unit of formula (VI):

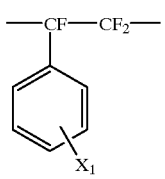
(VI)

and a second monomer unit of formula (VII):

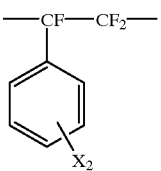
(VII)

wherein $X_1$ and $X_2$ are different ion-exchange groups. Again these substituents may be introduced via precursor groups present in the grafted monomers, or subsequently to the graft polymerization reaction.

In all the above embodiments of an ion-exchange membrane, preferred ion-exchange substituents or groups are $SO_3H$, $PO_2H_2$, $PO_3H_2$, $CH_2PO_3H_2$, $COOH$, $OSO_3H$, $OPO_2H_2$, $OPO_3H_2$, $NRR'R''^-$ and $CH_2NRR'R''^+$ (where R, R' and R'' are independently selected from the group consisting of hydrogen, alkyl, fluoroalkyl and aryl). The sulfonic acid substituent $SO_3H$, is particularly preferred.

In any of the embodiments of an ion-exchange membrane described above, the grafted chains may be homopolymeric or may be copolymeric. Copolymeric grafted chains may comprise, or may consist predominantly of, one or more monomer units described by the formulae. In some embodiments, copolymeric grafted chains may consist of a mixture of monomer units described by the formulae.

The preformed polymeric film or substrate for the grafting reaction is preferably selected so that it imparts mechanical strength to the membrane and will be physically and chemically stable to irradiation and under the conditions to which it is to be exposed in the end-use application for the membrane. Suitable materials generally include homopolymers or copolymers of non-fluorinated, fluorinated and perfluorinated vinyl monomers. Fluorinated and perfluorinated polymers are preferred for certain applications due to their enhanced oxidative and thermal stability. Suitable materials include, but are not limited to, polyvinylidene fluoride, poly(tetrafluoroethylene-co-perfluorovinylether), poly co-hexafluoropropylene), poly (chlorotrifluoroethylene-co-ethylene), polyethylene and polypropylene, and particularly poly(ethylene-co-tetrafluoroethylene) and polytetrafluoroethylene.

The polymeric base film may be porous or substantially gas impermeable. Porous base films may be used where the resultant grafted membrane is not required to be gas impermeable, for example, in filtration applications. However, for most electrochemical applications it is preferable that the ion-exchange membranes, and therefore the polymeric base film, be substantially gas impermeable, for example, for use in electrochemical fuel cells. In these or other applications, the ion-exchange membranes may be used in conjunction with one or more electrodes, in some cases in a consolidated electrode apparatus or a membrane electrode assembly.

Even when the grafted chains have a high ion-exchange capacity, which in isolation would tend to render them more water-soluble, the presence of the polymeric base film in the grafted membranes can reduce the water solubility of the membrane as a whole and increase dimensional stability on hydration/dehydration. This is an important advantage of these grafted ion-exchange membranes in applications, such as fuel cells, where high ion-exchange capacity but water insolubility, dimensional stability and low water content are desirable properties. Also, some of the homopolymers and copolymers described herein as grafted chains, would be unlikely to form mechanically stable membranes in isolation. Once again the presence of the base film can impart desirable properties to the grafted membrane. Also, depending on the nature of the preformed polymeric base film and the functionality of the grafted chains, the grafted ion-exchange membranes may reduce reactant crossover in fuel cell applications, for example, in direct methanol fuel cells.

The properties of the grafted membranes may be modified through varying degrees of cross-linking of the grafted chains by known methods, such as thermolysis, photolysis, plasma treatment and electron beam irradiation processes or the use of crosslinking agents.

As used above the term fluoroalkyl means any partially fluorinated or perfluorinated alkyl group, and the term halomethyl means any partially or fully halogenated methyl group. The abbreviation Ph is used to represent a phenyl group.

DETAILED DESCRIPTION OF THE PREFERRED EMBODIMENT

Figure 1:
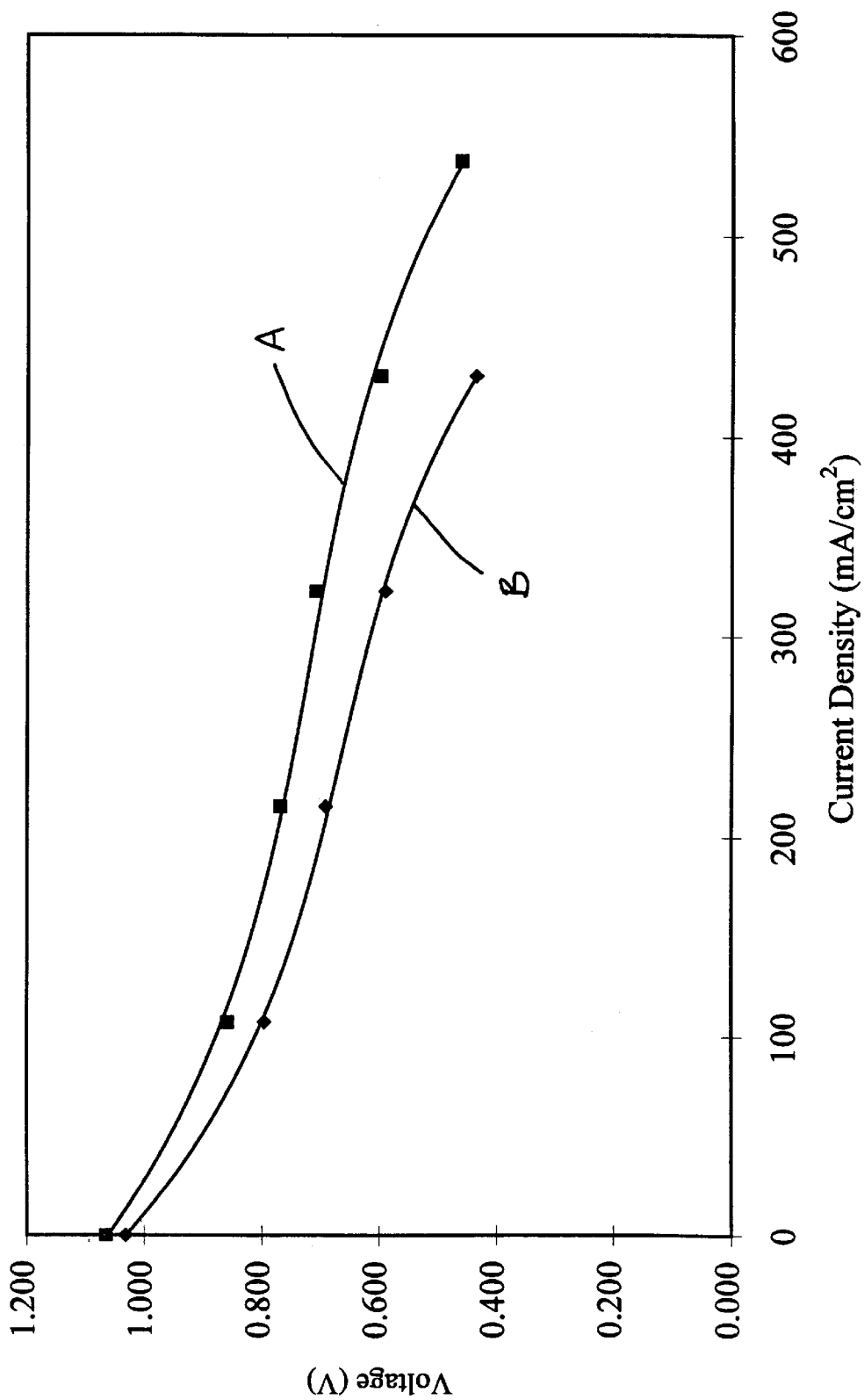
FIG. 1 is a plot of cell voltage as a function of current density (expressed in milliamperes per square centimeter) in an electrochemical fuel cell employing a sulfonated membrane of p-MeO-TFS grafted poly(ethylene-co-tetrafluoroethylene) (Tefzel®, trademark of DuPont) and operating on hydrogen-oxygen (plot A) and hydrogen-air (plot B).

Any radiation capable of introducing sufficient concentrations of free radical sites on the base polymeric film may be used in the preparation of the grafted polymeric membranes described herein. For example, the irradiation may be by gamma-rays, X-rays or electron beam. Electron beam irradiation is generally preferable as the process times are short and thus more suited to high volume production processes. The decay of the source and typically longer reactions times required with gamma radiation render it less suitable for high volume manufacturing processes.

The preformed polymeric base film may be pre-irradiated prior to bringing it into contact with the monomer or monomer mixture to be grafted or the substrate and monomer(s) may be irradiated together (co-irradiation).

In the grafting reaction, the polymeric base film is treated with the monomer(s) in the liquid phase, either as neat liquids or in a solution. It can be advantageous to select a solvent which will cause the solution to penetrate the base film and cause it to swell. This facilitates grafting of the monomer(s) throughout the membrane thickness. Preferably the irradiation and grafting process is carried out in an inert atmosphere.

For the preparation of membranes, grafting to a preformed base film is generally more efficient and cost-effective than grafting to a substrate in some other form such as a powder and then forming a membrane from the graft material.

The following examples are for purposes of illustration and are not intended to limit the invention.

EXAMPLE 1

Grafting of p-SO$_2$F-TFS to poly(ethylene-co-tetrafluoroethylene) (Tefzel®) Film A 2 mil (approx. 50 μm) thick, 7 inch×7 inch (17.78 cm×17.78 cm) piece of poly(ethylene-co-tetrafluoroethylene) (Tefzel®) film was irradiated with a dose of 5.2 Mrad using a cobalt −60 gamma radiation source, in an iner atmosphere. The irradiated base film was kept at −30° C. in inert atmosphere prior to use.

The irradiated membrane was placed in a reactor chamber and treated with neat, freshly distilled p-SO$_2$F-TFS (200 g) in an inert atmosphere at 50° C. for 50 hours. The membrane was removed and washed with heptane. The percentage graft, which is calculated by expressing the weight increase of the film as a percentage of the weight of the grafted film, was 20%. The grafted film was placed in a 33% w/v aqueous solution of potassium hydroxide at 80° C. to hydrolyze the sulfonyl fluoride substituents to give a theoretical equivalent weight of approximately 1500 g/mole based on the percentage graft.

The above procedure was also performed using a 3 mil (approx. 75 μm) thick, 7 inch×7 inch (17.78 cm×17.78 cm) piece of film, and gave a similar percentage graft.

EXAMPLE 2

Grafting of p-PhO-TFS to poly(ethylene-co-tetrafluoroethylene) (Tefzel®) Film and Sulfonation of the Grafted Membrane a) A 2 mil (approx. 50 μm) thick, 7 inch×7 inch (17.78 cm×17.78 cm) film of poly(ethylene-co-tetrafluoroethylene) (Tefzel®)was irradiated with a dose of 5.3 Mrad using a coba −60 gamma radiation source, in an inert atmosphere. The irradiated base film was kept at −30° C. in inert atmosphere prior to use. The irradiated membrane was treated with a degassed solution of p-PhO-TFS (86.8 g) in toluene (86.8 g) in an inert atmosphere at 50° C. for approximately 100 hours. The membrane was removed and washed with heptane and dried at 30° C. The percentage graft was 11%.

b) The grafted membrane was sulfonated by immersion in a solution of chlorosulfonic acid (60 mL) in 1,1,2,2-tetrachloroethane (140 mL) for 1.5 hours at 100° C. The resultant ion-exchange membrane was washed with water. The equivalent weight of the hydrolyzed membrane was 1490 g/mole, indicating incorporation of an average of approximately two sulfonic acid sites per monomer unit in the grafted chains, with a water content of 11%.

EXAMPLE 3

Grafting of p-MeO-TFS to poly(ethylene-co-tetrafluoroethylene) (Tefzel®) Film and Sulfonation of the Grafted Membrane A 2 mil (approx. 50 μm) thick, 7 inch×7 inch (17.78 cm×17.78 cm) film of poly(ethylene-co-tetrafluoroethylene) (Tefzel®)was irradiated, treated with a solution of p-MeO-TFS and sulfonated using a similar procedure to that described in Example 2. The resultant ion-exchange membrane had an equivalent weight of 1101 g/mole.

EXAMPLE 4

Use of Sulfonated p-MeO-TFS grafted poly (ethylene-co-tetrafluoroethylene) (Tefzel®) Membrane as an Ion-exchange Membrane in a Fuel Cell The membrane prepared as described in Example 3 was bonded to two catalyzed carbon fiber paper electrodes to form a membrane electrode assembly having a total platinum catalyst loading of 8 mg/cm$^2$. The membrane electrode assembly was tested in a Ballard Mark IV single cell fuel cell. The following operating conditions were used:

Temperature: 80° C.

Reactant inlet pressure: 30 psig for oxidant and fuel

Reactant stoichiometries: 2.0 oxidant and 1.5 hydrogen.

FIG. 1 shows polarization plots of voltage as a function of current density for the sulfonated grafted membrane employed in a membrane electrode assembly in the electrochemical fuel cell operating on hydrogen-oxygen (plot A) and hydrogen-air (plot B).

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A membrane comprising a preformed polymeric base film to which has been graft polymerized at least one monomer selected from the group consisting of monomers of formula (I)

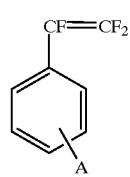

(I)

and formula (II)

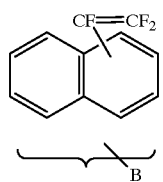

where A and B are independently selected from the group consisting of:

OR, SR, NRR' (where R and R' are independently selected from the group consisting of alkyl, fluoroalkyl and aryl), Ph, OPh, SPh, N(R)Ph (where R is selected from the group consisting of hydrogen, Ph, alkyl and fluoroalkyl), $(CH_2)_n Ph$ and $(CF_2)_n Ph$ (where n is an integer greater than zero), $SO_2X$ (where X is selected from the group consisting of F, Cl, Br, I), OH, $NH_2$, CN, and $NO_2$, and the group from which B is selected further consists of hydrogen.

2. A membrane according to claim 1 comprising a preformed polymeric base film to which has been graft polymerized a monomer of formula (I) wherein A is selected from the group consisting of OR, SR, NRR' (where R and R' are independently selected from the group consisting of alkyl, fluoroalkyl and aryl).

3. A membrane according to claim 1 comprising a preformed polymeric base film to which has been graft polymerized a monomer of formula (I) wherein A is selected from the group consisting of Ph, OPh, SPh, N(R)Ph (where R is selected from the group consisting of hydrogen, Ph, alkyl and fluoroalkyl).

4. A membrane according to claim 1 comprising a preformed polymeric base film to which has been graft polymerized a monomer of formula (II) wherein B is selected from the group consisting of hydrogen, OR, SR, NRR' (where R and R' are independently selected from the group consisting of alkyl, fluoroalkyl and aryl), Ph, OPh, SPh, N(R)Ph (where R is selected from the group consisting of hydrogen, Ph, alkyl and fluoroalkyl).

5. A membrane according to claim 1 comprising a preformed polymeric base film to which has been graft polymerized a single monomer whereby the grafted chains are homopolymeric.

6. A membrane according to claim 1 comprising a preformed polymeric base film to which has been graft polymerized more than one monomer selected from the group consisting of monomers of formula (I) and formula (II), whereby said grafted chains are copolymeric.

7. A membrane according to claim 1 comprising a preformed polymeric base film to which has been graft polymerized a monomer of formula (III) with said monomer selected from the group consisting of monomers of formula (I) and formula (II):

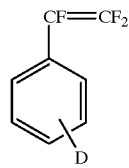

where D is selected from the group consisting of hydrogen, halomethyl, perfluoroalkyl, perfluoroalkenyl and fluorine and $SO_3^- M^+$.

8. A membrane according to claim 1 wherein at least a portion of the grafted chains are cross-linked.

9. A method of preparing a membrane comprising graft polymerizing to a preformed polymeric base film a monomer selected from the group consisting of monomers of formula (I)

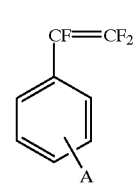

and formula (II)

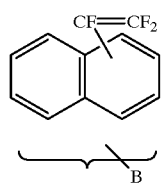

where A and B are independently selected from the group consisting of:

OR, SR, NRR' (where R and R' are independently selected from the group consisting of alkyl, fluoroalkyl and aryl), Ph, OPh, SPh, N(R)Ph (where R is selected from the group consisting of hydrogen, Ph, alkyl and fluoroalkyl), $(CH_2)_n Ph$ and $(CF_2)_n Ph$ (where n is an integer greater than zero), $SO_2X$ (where X is selected from the group consisting of F, Cl, Br, I), OH, $NH_2$, CN, and $NO_2$, and the group from which B is selected further consists of hydrogen.

10. A membrane prepared by subjecting a membrane of claim 1 to a reaction process selected from the group consisting of sulfonation, phosphonation, phosphorylation, amination, carboxylation, hydroxylation and nitration.

11. An ion-exchange membrane comprising a preformed polymeric base film with grafted chains comprising at least one monomer units selected from the group consisting of monomer units of formula (IV)

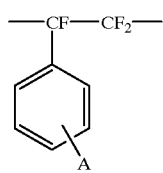

(IV)

and formula (V)

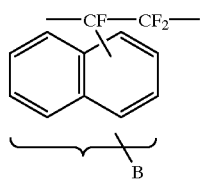

(V)

where A and B are independently selected from the group consisting of:
- OH, OR, SR, NRR' (where R and R' are independently selected from the group consisting of alkyl, fluoroalkyl and aryl),
- Ph, OPh, SPh, N(R)Ph (where R is selected from the group consisting of hydrogen, Ph, alkyl and fluoroalkyl), $(CH_2)_nPh$ and $(CF_2)_nPh$ (where n is an integer greater than zero),
- and the group from which B is selected further consists of hydrogen;
  wherein at least a portion of said monomer units comprise at least one ion-exchange substituent.

12. An ion-exchange membrane according to claim 11 wherein at least a portion of said monomer units comprise at least two ion-exchange substituents.

13. An ion-exchange membrane according to claim 11 wherein said grafted chains comprise an average of greater than one ion-exchange substituent per monomer unit in said grafted chains.

14. An ion-exchange membrane according to claim 11 wherein said grafted chains comprise at least two different types of ion-exchange groups.

15. An ion-exchange membrane according to claim 14 wherein said grafted chains comprise an anion exchange group and a cation exchange group.

16. An ion-exchange membrane according to claim 11 wherein at least a portion of the grafted chains are cross-linked.

17. An ion-exchange membrane according to claim 11 wherein said ion-exchange membrane is substantially gas impermeable.

18. An ion-exchange membrane according to claim 12 wherein said monomer units are of formula (IV) and the group from which A is selected consists of hydrogen, OR, SR, NRR' (where R and R' are independently selected from the group consisting of alkyl, fluoroalkyl and aryl).

19. An ion-exchange membrane according to claim 18 wherein A is selected from the group consisting of OR (where R is selected from the group consisting of alkyl and fluoroalkyl) and at least a portion of said monomer units comprise two $SO_3H$ substituents.

20. An ion-exchange membrane according to claim 12 wherein said monomer units are of formula (IV) and the group from which A is selected consists of Ph, OPh, SPh, N(R)Ph (where R is selected from the group consisting of hydrogen, Ph, alkyl and fluoroalkyl), $(CH_2)_nPh$ and $(CF_2)_nPh$ (where n is an integer greater than zero).

21. An ion-exchange membrane according to claim 20 wherein A is OPh, and at least a portion of said monomer units comprise two $SO_3H$ substituents.

22. An ion-exchange membrane according to claim 12 wherein said monomer units are of formula (V).

23. An electrode apparatus comprising an ion-exchange membrane of claim 17.

24. A membrane electrode assembly comprising an ion-exchange membrane of claim 17.

25. An electrochemical fuel cell comprising an ion-exchange membrane of claim 17.

26. An electrochemical fuel cell according to claim 25 wherein said preformed polymeric base film is less than 50 μm thick.

27. An ion-exchange membrane comprising a preformed polymeric base film with grafted chains comprising a first monomer unit of formula (VI)

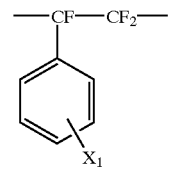

(VI)

and a second monomer unit of formula (VII)

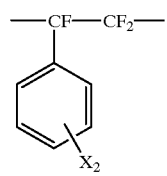

(VII)

wherein $X_1$ and $X_2$ are different ion-exchange substituents.

28. An ion-exchange membrane according to claim 27 wherein at least a portion of the grafted chains are cross-linked.

29. An ion-exchange membrane according to claim 27 wherein said ion-exchange membrane is substantially gas impermeable.

30. An electrode apparatus comprising an ion-exchange membrane of claim 29.

31. A membrane electrode assembly comprising an ion-exchange membrane of claim 29.

32. An electrochemical fuel cell comprising an ion-exchange membrane of claim 29.

33. An electrochemical fuel cell according to claim 32 wherein said preformed polymeric base film is less than 50 μm thick.

34. A liquid feed electrochemical fuel cell comprising an ion-exchange membrane of claim 17.

35. A liquid feed electrochemical fuel cell according to claim 34 wherein said fuel cell is a direct methanol fuel cell.

36. A liquid feed electrochemical fuel cell comprising an ion-exchange membrane of claim 29.

37. A liquid feed electrochemical fuel cell according to claim 36 wherein said fuel cell is a direct methanol fuel cell.

38. A method of preparing the ion-exchange membrane according to claim 11, said method comprising the step of grafting at least one monomer selected from the group consisting of monomer units of formula (IV) and formula (V) to a preformed polymeric base film.

39. A method of preparing the membrane according to claim 1, said method comprising the step of grafting at least one monomer selected from the group consisting of monomers of formula (I) and formula (II) to a preformed polymeric base film.

* * * * *

UNITED STATES PATENT AND TRADEMARK OFFICE
CERTIFICATE OF CORRECTION

PATENT NO.    : 6,359,019 B1
DATED         : March 19, 2002
INVENTOR(S)   : Charles Stone and Alfred E. Steck It is certified that error appears in the above-identified patent and that said Letters Patent is hereby corrected as shown below:

Column 1,
Line 26, please correct "rinas" to read -- rings --
Line 60, please correct "coba" to read -- cobalt --

Column 4,
Line 27, please correct "$(CH_2)_nPH$" to read -- $(CH_2)_nPh$ --

Column 6,
Line 8, after "poly" and before "co-hexafluoropropylene)", please add -- (tetrafluoroethylene --

Signed and Sealed this

Eleventh Day of February, 2003

JAMES E. ROGAN
*Director of the United States Patent and Trademark Office*